United States Patent
Park et al.

(10) Patent No.: US 9,509,932 B2
(45) Date of Patent: Nov. 29, 2016

(54) IMAGE SENSORS, METHODS OF OPERATING THE SAME, AND IMAGE PROCESSING SYSTEMS INCLUDING THE SAME

(71) Applicants: Samsung Electronics Co., Ltd., Suwon-si, Gyeonggi-do (KR); Dongguk University Industry-Academic Cooperation Foundation, Seoul (KR)

(72) Inventors: Jae Jung Park, Hwaseong-si (KR); Dae Yun Kim, Seoul (KR); Jae Young Bae, Seoul (KR); Min Kyu Song, Seoul (KR)

(73) Assignees: Samsung Electronics Co., Ltd. (KR); Dongguk University Industry-Academic Cooperation Foundation, Seoul (KR)

(*) Notice: Subject to any disclaimer, the term of this patent is extended or adjusted under 35 U.S.C. 154(b) by 0 days.

(21) Appl. No.: 14/790,901

(22) Filed: Jul. 2, 2015

(65) Prior Publication Data

US 2016/0006957 A1    Jan. 7, 2016

(30) Foreign Application Priority Data

Jul. 3, 2014    (KR) ......................... 10-2014-0082867

(51) Int. Cl.
*H04N 5/228*    (2006.01)
*H04N 5/378*    (2011.01)

(52) U.S. Cl.
CPC .................... *H04N 5/378* (2013.01)

(58) Field of Classification Search
CPC .... H04N 5/378; H04N 5/3575; H04N 5/363; H04N 5/374; H04N 9/045
USPC ......... 348/220.1, 222.1, 241, 362, 294, 324; 341/155
See application file for complete search history.

(56) References Cited

U.S. PATENT DOCUMENTS

| 6,295,084 | B1* | 9/2001 | Nishizawa | H04N 5/232 348/211.1 |
|---|---|---|---|---|
| 7,683,817 | B2 | 3/2010 | Murata et al. | |
| 7,924,207 | B2 | 4/2011 | Snoeij et al. | |
| 8,089,541 | B2 | 1/2012 | Oike | |
| 8,253,809 | B2 | 8/2012 | Nishi | |
| 8,354,630 | B2 | 1/2013 | Hoshino | |
| 8,576,979 | B2* | 11/2013 | Mo | H04N 5/355 377/108 |

(Continued)

FOREIGN PATENT DOCUMENTS

| JP | 2008-136043 | 6/2008 |
|---|---|---|
| JP | 2013-051575 | 3/2013 |

(Continued)

*Primary Examiner* — Yogesh Aggarwal
(74) *Attorney, Agent, or Firm* — Myers Bigel, P.A.

(57) ABSTRACT

An image sensor may include a comparator including a first input terminal configured to receive a reset signal, a second input terminal configured to receive an image signal, a third input terminal configured to receive a ramp signal configured to ramp in one direction, and an output terminal. The comparator may further include a switch circuit including a plurality of switches. The comparator may be configured to compare the reset signal with the ramp signal and output a first comparison signal through the output terminal according to a first arrangement of the switches in a reset phase and the comparator may be configured to compare the image signal with the ramp signal and output a second comparison signal through the output terminal according to a second arrangement of the switches in an image phase.

18 Claims, 10 Drawing Sheets

(56) References Cited

U.S. PATENT DOCUMENTS

| | | | |
|---|---|---|---|
| 8,749,680 B2 * | 6/2014 | Hagihara | H04N 5/378 348/300 |
| 2008/0266163 A1 * | 10/2008 | Poulton | H03M 1/141 341/161 |
| 2012/0061555 A1 | 3/2012 | Ay | |

FOREIGN PATENT DOCUMENTS

| | | |
|---|---|---|
| KR | 1020030008325 | 1/2003 |
| KR | 1020060045836 | 5/2006 |
| KR | 101293057 | 7/2013 |
| KR | 1020130105034 | 9/2013 |

* cited by examiner

IMAGE SENSORS, METHODS OF OPERATING THE SAME, AND IMAGE PROCESSING SYSTEMS INCLUDING THE SAME

CROSS-REFERENCE TO RELATED APPLICATION

This application claims priority under 35 U.S.C. §119(a) from Korean Patent Application No. 10-2014-0082867, filed on Jul. 3, 2014 in the Korean Intellectual Property Office, the disclosure of which is hereby incorporated by reference in its entirety.

FIELD

Embodiments of the inventive concepts relate to complementary metal oxide semiconductor (CMOS) image sensors, and more particularly, to image sensors for performing correlated double sampling (CDS) without performing analog-to-digital conversion of a reset signal of a pixel, a method of operating the same, and image processing system including the same.

BACKGROUND

Single-slope analog-to-digital conversion may be used as an analog-to-digital conversion method for image sensors. According to this method, a ramp signal may be compared with a pixel signal having a predetermined voltage level and a counted time may be measured until the ramp signal has the same voltage level as the pixel signal and may be converted into a digital signal.

A single column analog-to-digital converter (ADC) may be integrated into a single pixel pitch in a column parallel analog-to-digital conversion method. Accordingly, when the area of a layout and power consumption is considered, the single-slope analog-to-digital conversion method may be used. An image sensor may use CDS, count a signal resulting from CDS, e.g., a difference between a reset signal and an image signal, and output a digital signal corresponding to the count result.

SUMMARY

Some embodiments of the inventive concepts provide an analog-to-digital converter (ADC) that performs correlated double sampling (CDS) without performing analog-to-digital conversion of a reset signal of a pixel.

According to some embodiments of the inventive concepts, there is provided an image sensor including a comparator including a first input terminal configured to receive a reset signal, a second input terminal configured to receive an image signal, a third input terminal configured to receive a ramp signal configured to ramp in one direction, and an output terminal. The comparator may further include a switch circuit including a plurality of switches. The comparator may be configured to compare the reset signal with the ramp signal and output a first comparison signal through the output terminal according to a first arrangement of the switches in a reset phase and the comparator may be configured to compare the image signal with the ramp signal and output a second comparison signal through the output terminal according to a second arrangement of the switches in an image phase.

In some embodiments, the image sensor may further include a control circuit configured to output control signals configured to change the first arrangement of the switches into the second arrangement of the switches to the switch circuit based on a state transition of the first comparison signal.

In some embodiments, the control circuit may be configured to output the control signals within a single period of a clock signal from the state transition of the first comparison signal.

In some embodiments, the image sensor may further include a counter configured to start counting based on a state transition of the first comparison signal and configured to stop counting based on a state transition of the second comparison signal.

In some embodiments, the comparator may be configured to transition from the reset phase to the image phase during a continuous ramp of the ramp signal in one direction.

In some embodiments, the comparator may be configured to compare the reset signal and the ramp signal and simultaneously compare the image signal and the ramp signal according to a third arrangement of the switches in an initialize phase.

In some embodiments, the image sensor may further include a first correlated double sampling (CDS) circuit configured to transmit the reset signal from a pixel to the first input terminal and a second CDS circuit configured to transmit the image signal from the pixel to the second input terminal. The first CDS circuit and the second CDS circuit may be configured to operate at different timings.

In some embodiments, the comparator may be a Gilbert cell.

In some embodiments, the comparator may be a single-slope analog-to-digital converter.

According to some embodiments of the inventive concepts, there is provided an image processing system including an image sensor and an application processor configured to control an operation of the image sensor through a camera serial interface. The image sensor may include a comparator including a first input terminal configured to receive a reset signal, a second input terminal configured to receive an image signal, a third input terminal configured to receive a ramp signal configured to ramp in one direction, and an output terminal. The image sensor may include a switch circuit including a plurality of switches. The comparator may be configured to compare the reset signal with the ramp signal and output a first comparison signal through the output terminal according to a first arrangement of the switches in a reset phase and the comparator may be configured to compare the image signal with the ramp signal and output a second comparison signal through the output terminal according to a second arrangement of the switches in an image phase.

In some embodiments, the image processing system may further include a control circuit configured to output control signals configured to change the first arrangement of the switches into the second arrangement of the switches to the switch circuit based on a state transition of the first comparison signal.

In some embodiments, the control circuit may be configured to output the control signals within a single period of a clock signal from the state transition of the first comparison signal.

In some embodiments, the image processing system may further include a counter configured to start counting based on a state transition of the first comparison signal and configured to stop counting based on a state transition of the second comparison signal.

In some embodiments, the comparator may be configured to transition from the reset phase to the image phase during a continuous ramp of the ramp signal in one direction.

In some embodiments, the comparator may be configured to compare the reset signal and the ramp signal and simultaneously compare the image signal and the ramp signal according to a third arrangement of the switches in an initialize phase.

According to some embodiments of the inventive concepts, there is provided a method of operating an image sensor. The method may include generating a ramp signal ramping in one direction. The method may include a reset phase which may include comparing a reset signal and the ramp signal, which are transmitted in a first arrangement of a plurality of switches, and outputting a first comparison signal using a comparator. The method may include an image phase which may include comparing an image signal and the ramp signal, which are transmitted in a second arrangement of the switches, and outputting a second comparison signal using the comparator.

In some embodiments, the method may further include changing the first arrangement into the second arrangement based on a state transition of the first comparison signal. The method may further include starting counting based on the state transition of the first comparison signal and stopping counting based on a state transition of the second comparison signal.

In some embodiments, the method may further include simultaneously comparing the reset signal and the image signal with the ramp signal using the comparator in an initialize phase. The reset signal, the image signal, and the ramp signal may be simultaneously transmitted to the comparator according to a third arrangement of the switches.

According to some embodiments of the inventive concepts, there is provided an image sensor. The image sensor may include a first comparator including a first input terminal configured to receive a reset signal based on a reset level of a pixel of the image sensor, and a second input terminal configured to receive at least one of a ramp signal and the reset signal based on a configuration of a first switch and a second switch. The image sensor may include a second comparator including a third input terminal configured to receive an image signal based on an image level of the pixel of the image sensor, and a fourth input terminal configured to receive at least one of the ramp signal and the image signal based on a configuration of a third switch and a fourth switch. The image sensor may include a comparator output terminal connected to the first comparator and the second comparator and configured to output a comparison signal based on a comparison between the ramp signal and at least one of the reset signal and the image signal. The image sensor may include a control circuit configured to configure the first through fourth switches to produce a first output signal at the comparator output terminal based on a comparison between the ramp signal and the reset signal during a continuous ramp of the ramp signal in one direction and, based on an output of the first signal, configure the first through fourth switches to produce a second output signal at the comparator output terminal based on a comparison between the ramp signal and the image signal during the continuous ramp of the ramp signal in the one direction.

In some embodiments, the image sensor may include a Gilbert cell including the first and second comparators.

In some embodiments, the image sensor may further include a counter configured to begin counting a digital count value based on the first output signal, stop counting the digital count value based on the second output signal, and output a digital count value.

In some embodiments, the image sensor may further include a fifth switch configured to electrically connect the comparator output terminal to the first input terminal during an initialization phase and a sixth switch configured to electrically connect the comparator output terminal to the third input terminal during an initialization phase. The control circuit may be further configured to configure the first through fourth switches to produce a third output signal at the comparator output terminal during the initialization phase based on a comparison between the ramp signal and the reset signal and based on a comparison between the ramp signal and the image signal.

In some embodiments, the image sensor may further include a first CDS circuit including a fifth switch configured to connect a pixel output to a first CDS node based on a first switch signal, a first capacitor electrically connected between the first CDS node and a ground, and a second capacitor connected between the first CDS node and the first input terminal. The image sensor may further include a second CDS circuit including a sixth switch configured to connect the pixel output to a second CDS node based on a second switch signal, a third capacitor electrically connected between the second CDS node and the ground, and a fourth capacitor connected between the second CDS node and the third input terminal.

BRIEF DESCRIPTION OF THE DRAWINGS

The above and other features and advantages of the inventive concepts will be more clearly understood from the following detailed description taken in conjunction with the accompanying drawings in which.

DETAILED DESCRIPTION OF THE EMBODIMENTS

The inventive concepts now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
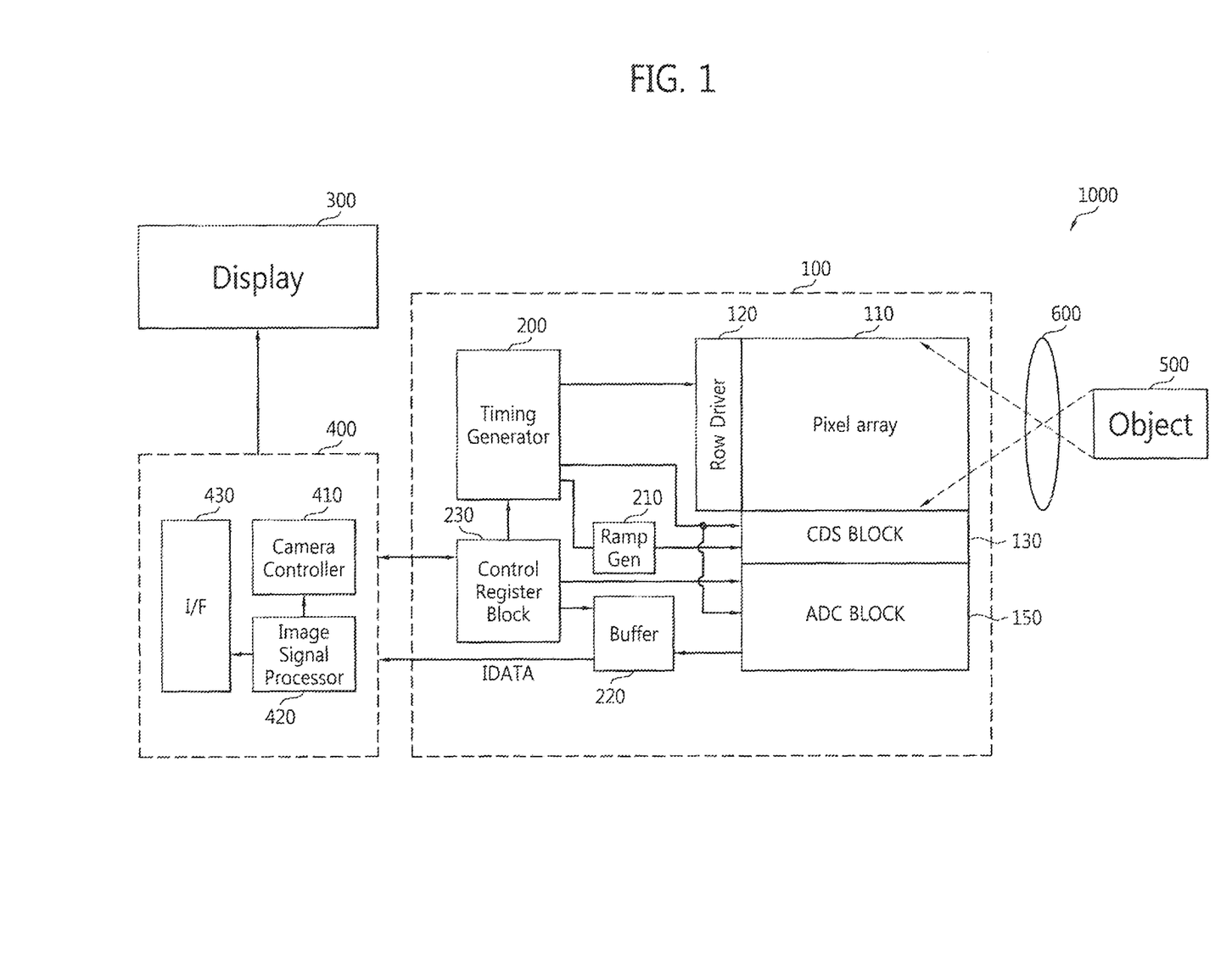
FIG. 1 is a schematic block diagram of an image processing system according to some embodiments of the inventive concepts.

FIG. 1 is a schematic block diagram of an image processing system 1000 according to some embodiments of the inventive concepts. The image processing system 1000 may be implemented as a portable electronic device such as a digital camera, a camcorder, a cellular phone, a smart phone, a tablet personal computer (PC), a personal digital assistant (PDA), a mobile internet device (MID), a wearable computer, an internet of things (IoT) device, or an internet of everything (IoE) device.

The image processing system 1000 may include a complementary metal oxide semiconductor (CMOS) image sensor (or CMOS image sensor) 100, a display 300, a digital signal processor (DSP) 400, and an optical lens 600. The CMOS image sensor 100 may generate image data IDATA from sensing an object 500 through the optical lens 600. The CMOS image sensor 100 may include a pixel array 110, a row driver 120, a correlated double sampling (CDS) block 130, an analog-to-digital converter (ADC) block 150, a timing generator (or a timing controller) 200, a ramp generator 210, a buffer 220, and a control register block 230.

The CMOS image sensor 100 may be controlled by the DSP 400 to sense the object 500 photographed (or input) through the optical lens 600 and to generate the image data IDATA corresponding to the sensing result.

The DSP 400 may output image signals (or display data), which correspond to the image data IDATA output from the CMOS image sensor 100, to the display 300. The DSP 400 may include a camera controller 410, an image signal processor (ISP) 420, and an interface (I/F) 430. The camera controller 410 may control the operations of the control register block 230. The camera controller 410 may control the operations of the CMOS image sensor 100, and more specifically, the control register block 230 using a protocol, e.g., an inter-integrated circuit (12C) protocol, but the inventive concepts are not restricted thereto.

The control register block 230 may store control bits for controlling the operations of the ADC block 150, the timing generator 200, and the buffer 220.

The ISP 420 may receive the image data IDATA output from the buffer 220, process the image data IDATA, and output processed image signals to the display 300 through the I/F 430. Although the ISP 420 is placed within the DSP 400 in the embodiments illustrated in FIG. 1, the ISP 420 may be placed within the CMOS image sensor 100 in other embodiments. The CMOS image sensor 100 and the ISP 420 may be implemented in a single package, e.g., a multi-chip package or package-on-package (PoP).

Figure 2:
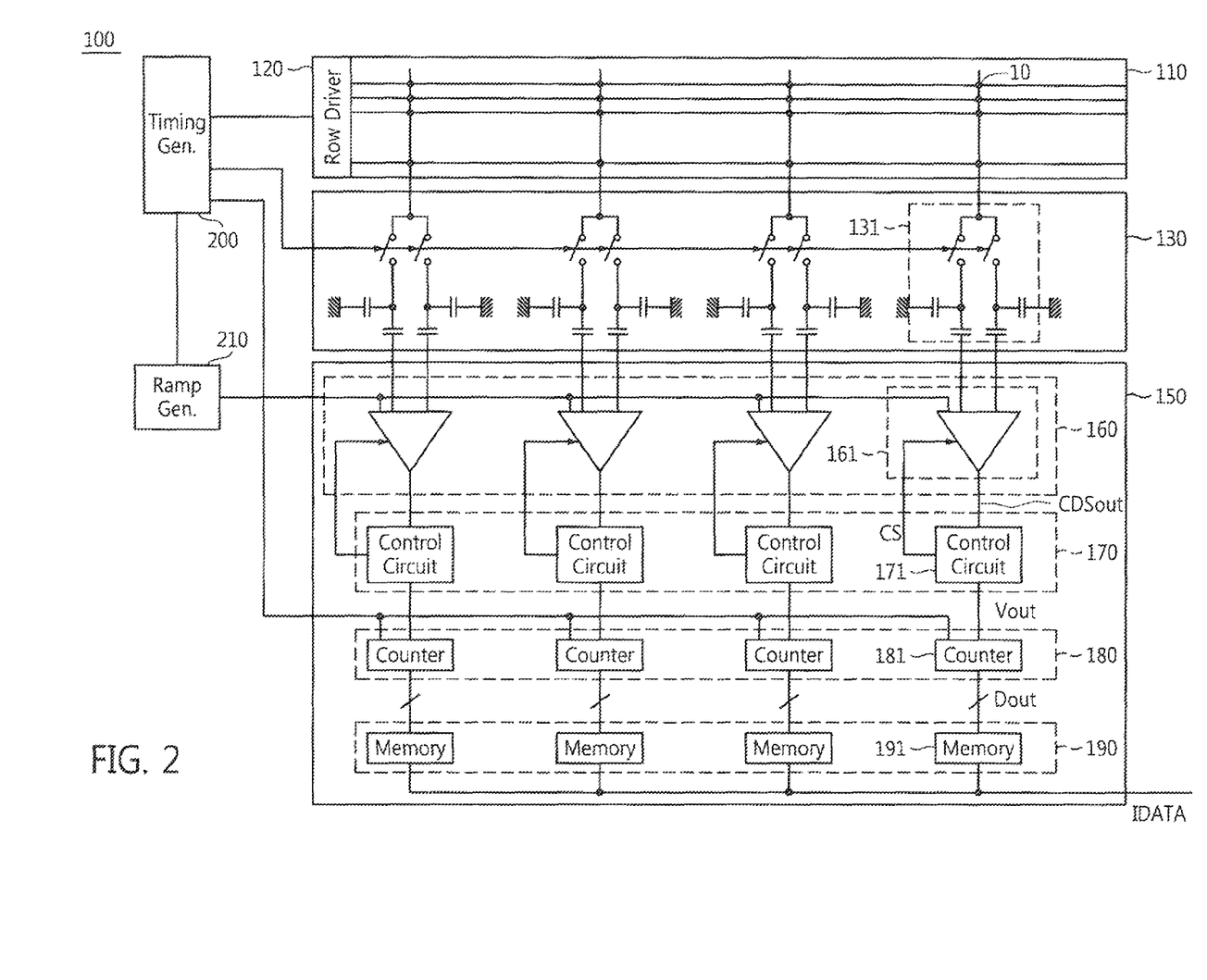
FIG. 2 is a detailed block diagram of a complementary metal oxide semiconductor (CMOS) image sensor illustrated in FIG. 1.

FIG. 2 is a detailed block diagram of the CMOS image sensor 100 illustrated in FIG. 1. Referring to FIGS. 1 and 2, the pixel array 110 may include a plurality of pixels 10 arranged in a matrix. Each of the pixels 10 may include a photosensitive element (or a photoelectric conversion element) and a readout circuit which may output a pixel signal corresponding to charges generated by the photosensitive element. The photosensitive element may be implemented, for example, as a photodiode, a photo gate, or a pinned photodiode.

The row driver 120 may control the operation of the pixels 10. The row driver 120 may drive the pixels 10 in units of rows in the pixel array 110. For instance, the row driver 120 may generate control signals for controlling the operation of pixels 10 in each of the rows.

A pixel signal output from each of the pixels 10 may be transmitted to the CDS block 130 according to the control signals. The timing generator 200 may generate at least one control signal to control the operation of at least one among the row driver 120, the CDS block 130, a counter block 180, and the ramp generator 210.

The CDS block 130 may include a plurality of CDS circuits 131. Each of the CDS circuits 131 may perform CDS of a pixel signal output from a respective one of the pixels 10 in response to at least one switch signal output from the timing generator 200, and may store a sampled pixel signal (hereinafter referred to as a CDS pixel signal) in a plurality of capacitors.

The ADC block 150 may include a comparison block 160, a control block 170, the counter block 180, and a memory block 190. For clarity of the description, the ADC block 150 includes the control block 170, the counter block 180, and the memory block 190 in the embodiment illustrated in FIG. 2, but, in some embodiments, at least one among the control block 170, the counter block 180, and the memory block 190 may be formed outside the ADC block 150. Although the memory block 190 and the buffer 220 may be separate elements in some embodiments, the buffer 220 may include the memory block 190 in other embodiments.

Figure 7:
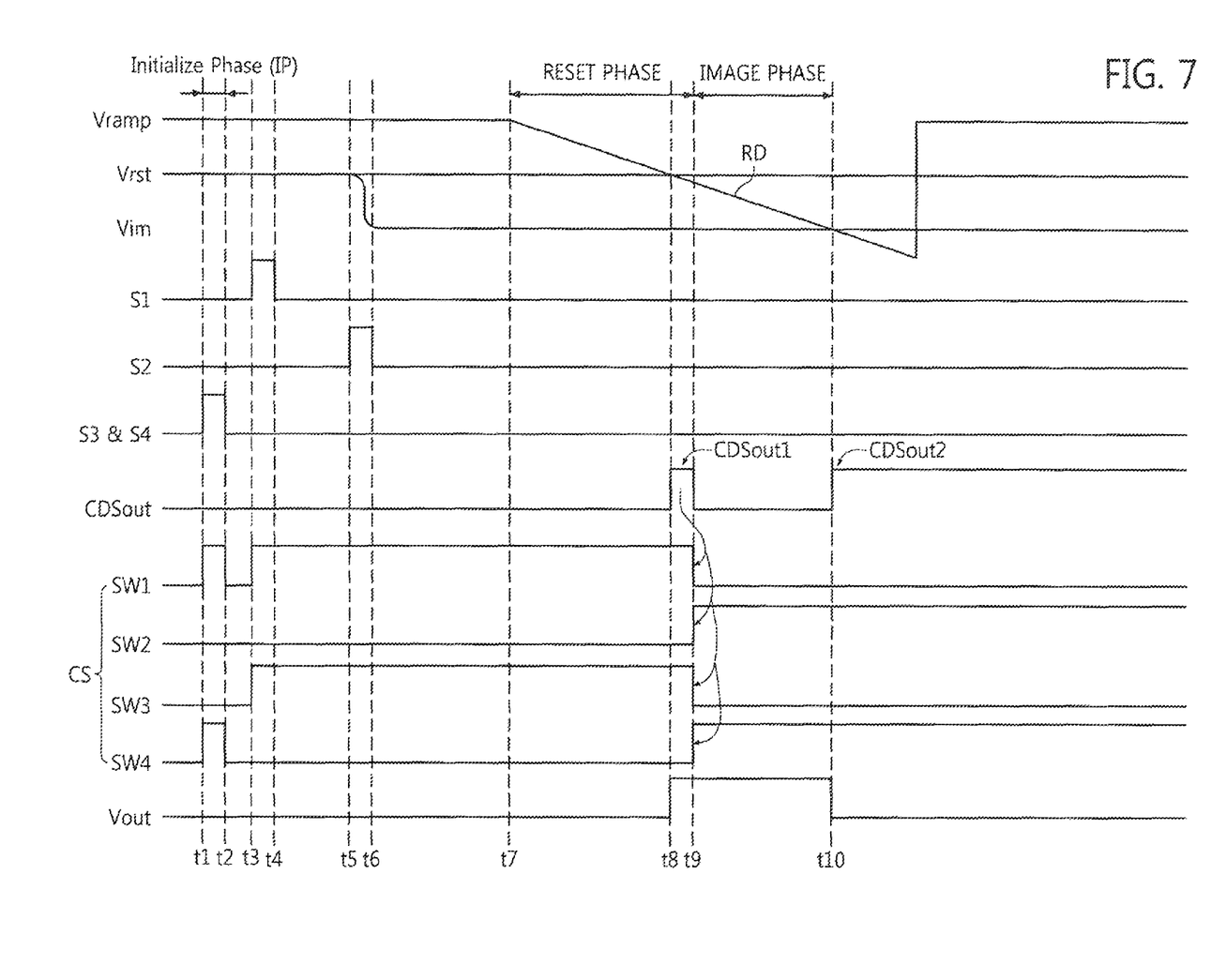
FIG. 7 is a timing chart showing an operation of the comparison circuit illustrated in FIG. 3.

The comparison block 160 may include a plurality of sub comparison blocks 161. Each of the sub comparison blocks 161 may compare a ramp signal Vramp (FIG. 7) output from the ramp generator 210 with a reset signal Vrst (FIG. 7) output from a pixel 10 to output a first comparison signal CDSout1 (FIG. 7) and may compare the ramp signal Vramp with an image signal Vim (FIG. 7) to output a second comparison signal CDSout2 (FIG. 7). In detail, each sub comparison block 161 may compare a first portion of the ramp signal Vramp with the reset signal Vrst to output the first comparison signal CDSout1 and then may compare a second portion of the ramp signal Vramp with the image signal Vim to output the second comparison signal CDSout2. The first portion and the second portion of the ramp signal Vramp may have the same slope and may be continuous with each other.

The control block 170 may include a plurality of control circuits 171. Each of the control circuits 171 may output control signals CS (FIG. 7) that are generated based on state transition of the first comparison signal CDSout1 to a corresponding one of the sub comparison blocks 161.

The counter block 180 may include a plurality of counters 181. Each of the counters 181 may count a state transition time of an output signal Vout, shown in FIG. 7, output from a corresponding one of the control circuits 171 using a clock signal CLK (FIG. 3) and outputs a count signal Dout.

The memory block 190 may include a plurality of memories 191. Each of the memories 191 may receive and store the count signal Dout output from a corresponding one of the counters 181. The image data IDATA may correspond to the count signal Dout output from each of the memories 171. The count signal Dout may be represented by bits.

The ramp generator 210 may output the ramp signal Vramp, which ramps down once as shown in FIG. 7, to the CDS block 160. In a conventional single-slope analog-to-digital conversion method, the ramp signal Vramp may ramp down from a reference level to be compared with the reset signal Vrst and then rise to the reference level and ramp down again from the reference level to be compared with the image signal Vim. However, according to some embodiments, the ramp signal Vramp may ramp in one direction as shown in FIG. 7.

Figure 3:
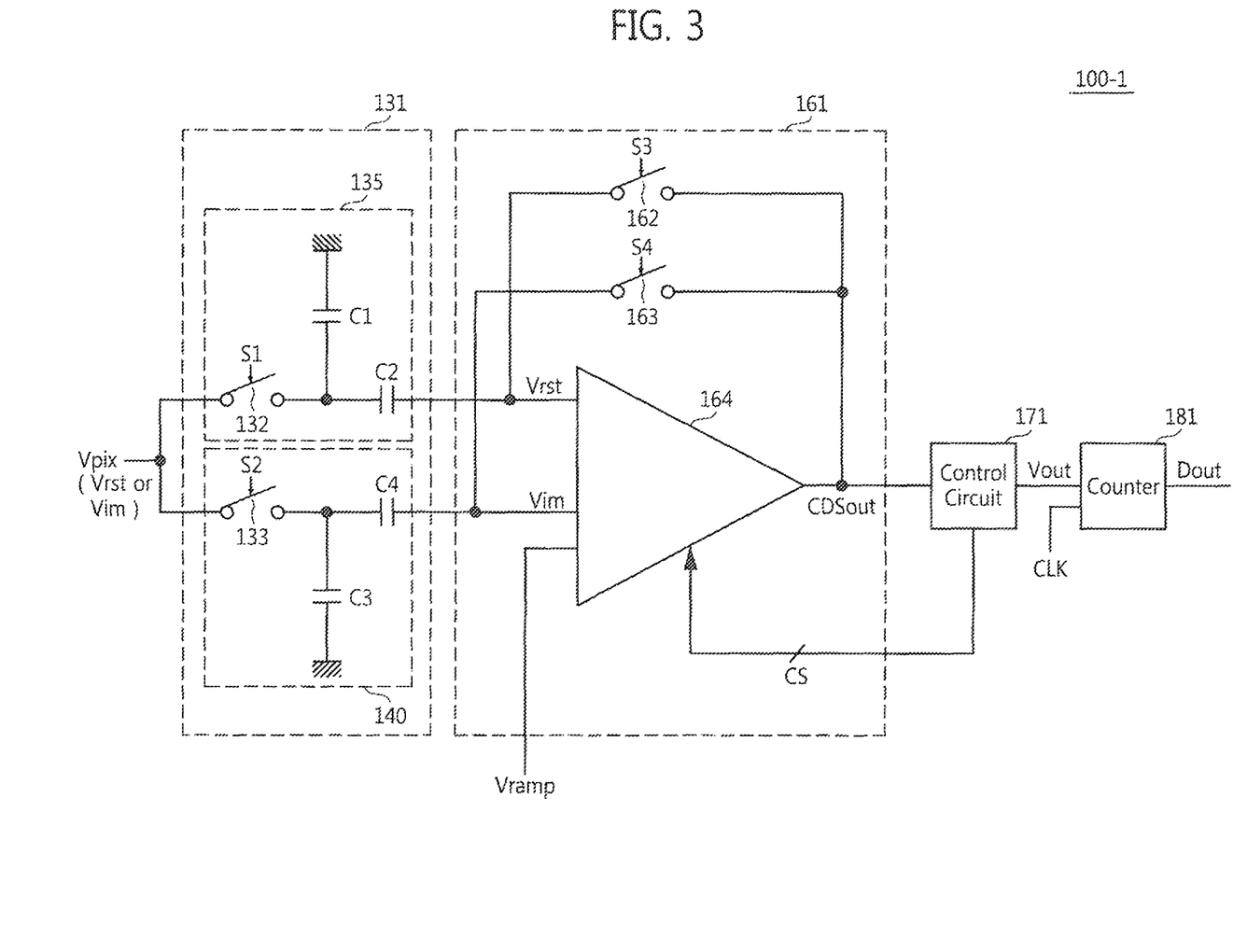
FIG. 3 is a schematic block diagram of a portion of the CMOS image sensor illustrated in FIG. 1.

FIG. 3 is a schematic block diagram of a portion 100-1 of the CMOS image sensor 100 illustrated in FIG. 1. For clarity of the description, FIG. 3 illustrates the portion 100-1 of the CMOS image sensor 100 that may process a pixel signal Vpix output through a single column. The portion 100-1 may include a CDS circuit 131, a sub comparison block 161, a control circuit 171, and a counter 181.

The CDS circuit 131 may include a first CDS circuit 135 and a second CDS circuit 140. The first CDS circuit 135 may perform sampling (e.g., CDS) on the pixel signal Vpix, i.e., the reset signal Vrst output from the pixel 10. The first CDS circuit 135 may include a first switch 132, a first capacitor C1, and a second capacitor C2. Referring to FIGS. 3 and 7, the first switch 132 may be switched in response to a first switch signal S1.

The first switch 132 may transmit the pixel signal Vpix, i.e., the reset signal Vrst from the pixel 10, to the first capacitor C1 and the second capacitor C2. The first capacitor C may be connected between the first switch 132 and ground. The second capacitor C2 may be connected between the first switch 132 and a first input terminal of the sub comparison block 161. The first and second capacitors C1 and C2 may be used to sample the reset signal Vrst output from the pixel 10.

The second CDS circuit 140 may perform sampling (e.g., CDS) on the pixel signal Vpix, i.e., the image signal Vim output from the pixel 10. The second CDS circuit 140 may include a second switch 133, a third capacitor C3, and a fourth capacitor C4. Referring to FIGS. 3 and 7, the second switch 133 may be switched in response to a second switch signal 82.

The second switch 133 may transmit the pixel signal Vpix, i.e., the image signal Vim from the pixel 10, to the third capacitor C3 and the fourth capacitor C4. The third capacitor C3 may be connected between the second switch 133 and ground. The fourth capacitor C4 may be connected between the second switch 133 and a second input terminal of the sub comparison block 161. The third and fourth capacitors C3 and C4 may be used to sample the image signal Vim output from the pixel 10.

The sub comparison block 161 may include a comparison circuit 164, a third switch 162, and a fourth switch 163. Referring to FIGS. 3 and 7, the third switch 162 may be switched in response to a third switch signal S3 and the fourth switch 163 may be switched in response to a fourth switch signal S4. The switch signals S1 through 84 may be output from the timing generator 200. The sub comparison block 161 may reset the comparison circuit 164 using the third and fourth switches 162 and 163. The resetting of the comparison circuit 164 will be described in detail with reference to FIG. 4.

The comparison circuit 164 may receive the reset signal Vrst from the first CDS circuit 135, the image signal Vim from the second CDS circuit 140, and the ramp signal Vramp from the ramp generator 210. The comparison circuit 164 may compare the reset signal Vrst with the ramp signal Vramp, and may output the first comparison signal CDSout1, may compare the image signal Vim with the ramp signal Vramp, and may generate the second comparison signal CDSout2.

The control circuit 171 may output the control signals CS to the comparison circuit 164 based on the state transition of the first comparison signal CDSout1. The control circuit 171 may also output the output signal Vout to the counter 181 based on the state transition of the first comparison signal CDSout1 and the state transition of the second comparison signal CDSout2.

The counter 181 may convert a level transition time of the output signal Vout into the digital signal Dout using the clock signal CLK and may output the digital signal Dout. For instance, the counter 181 may start counting based on the state transition of the first comparison signal CDSout1 and may stop counting based on the state transition of the second comparison signal CDSout2.

Figure 4:
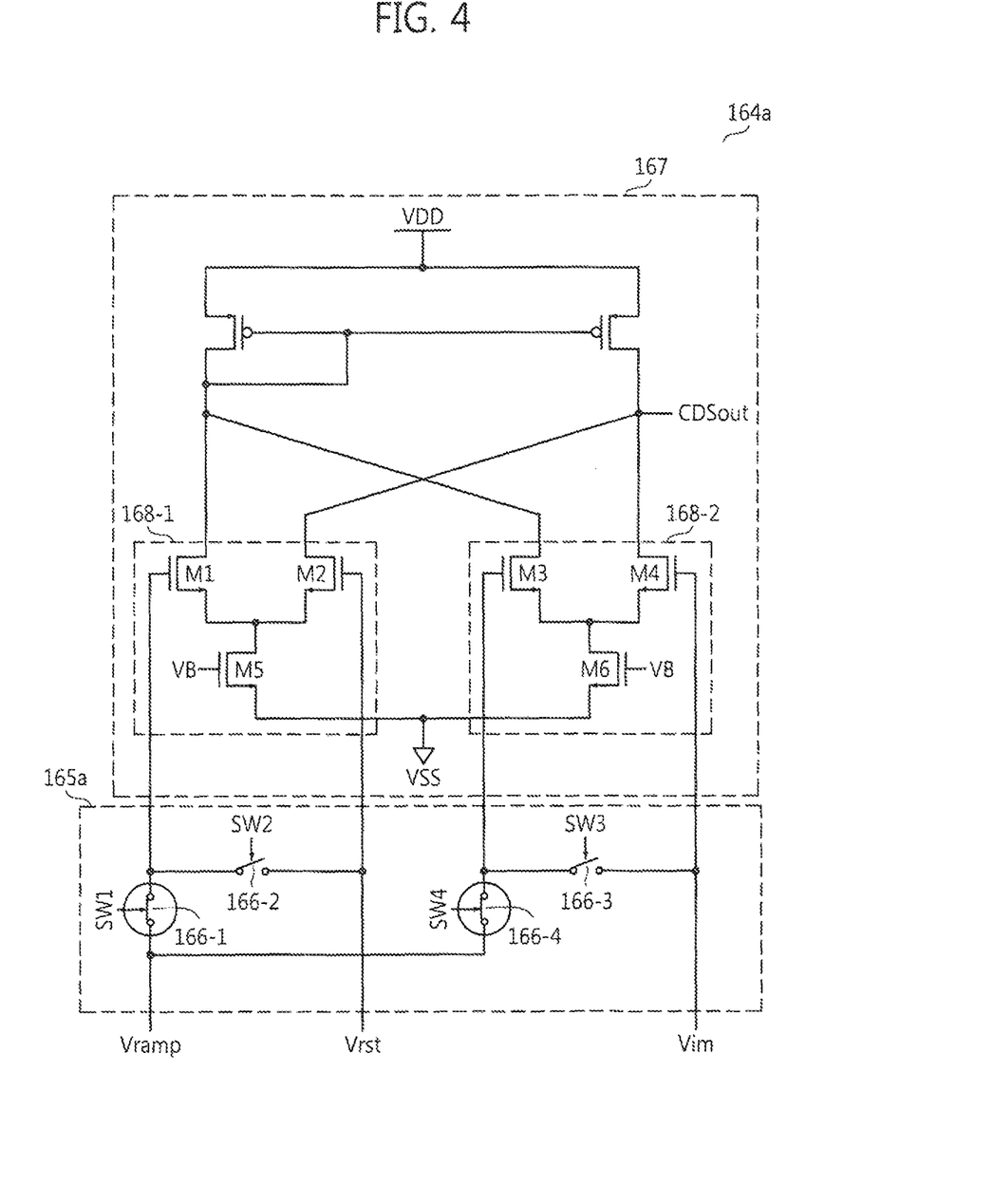
FIG. 4 is a schematic block diagram of a comparison circuit illustrated in FIG. 3 including a third arrangement of a switch circuit.

FIG. 4 is a schematic block diagram of a comparison circuit 164a corresponding to the comparison circuit 164 illustrated in FIG. 3 that includes a third arrangement of a switch circuit 165a. Referring to FIGS. 3 and 4, the comparison circuit 164a may include the switch circuit 165a and a comparator 167. The switch circuit 165a may include a fifth switch 166-1, a sixth switch 166-2, a seventh switch 166-3, and an eighth switch 166-4. The fifth through eighth switches 166-1, 166-2, 166-3, and 166-4 may operate in response to the control signals CS, e.g., a first switch control signal SW1, a second switch control signal SW2, a third switch control signal SW3, and a fourth switch control signal SW4, respectively, output from the control circuit 171.

The comparator 167 may include a first comparator 168-1 and a second comparator 168-2. The first comparator 168-1 may compare the reset signal Vrst and the ramp signal Vramp, which may be transmitted from the switch circuit 165a, and may output the comparison signal CDSout, i.e., the first comparison signal CDSout1 corresponding to the comparison result, to the control circuit 171 using a first transistor pair M1 and M2 and a fifth transistor M5 that receives a bias voltage VB.

The second comparator 168-2 may compare the image signal Vim and the ramp signal Vramp, which may be transmitted from the switch circuit 165a, and may output the comparison signal CDSout, i.e., the second comparison signal CDSout2 corresponding to the comparison result, to the control circuit 171 using a second transistor pair M3 and M4 and a sixth transistor M6 that receives the bias voltage VB. The comparator 167 may be implemented as a Gilbert cell including the first transistor pair M1 and M2 and the second transistor pair M3 and M4. The comparator 167 may be a single-slope ADC.

Referring to FIGS. 4 and 7, an initialize phase (IP) in which an offset of the comparator 167 may be reduced or eliminated is defined by time points t1 and t2, a first comparison phase or a reset phase in which the reset signal Vrst may be compared with the ramp signal Vramp is defined by time points t7 and t9, and a second comparison phase or an image phase in which the image signal Vim may be compared with the ramp signal Vramp is defined by time points t9 and t10. In other words, the comparator 167 operates continuously during the IP, the reset phase, and the image phase.

Referring to FIGS. 4 and 7, when the fifth and eight switches 166-1 and 166-4 are turned on (closed) during the IP, as illustrated in FIG. 7, the comparator 167 may perform the first comparison of the reset signal Vrst and the ramp signal Vramp and the second comparison of the image signal Vim and the ramp signal Vramp simultaneously. When the fifth and eight switches 166-1 and 166-4 are turned on and the sixth and seventh switches 166-2 and 166-3 are turned off, the switch circuit 165a is referred to as being in a third arrangement.

Figure 5:
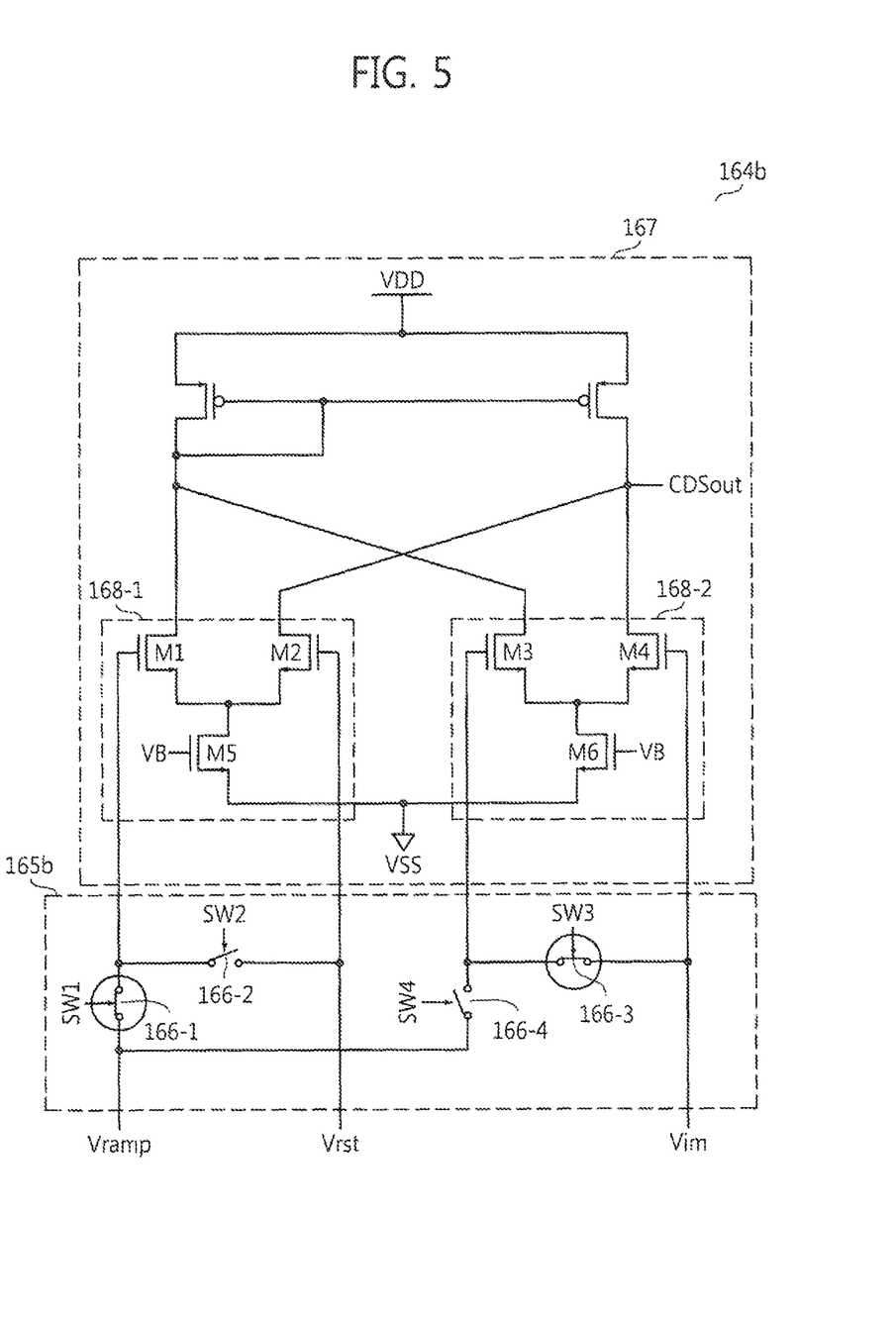
FIG. 5 is a schematic block diagram of the comparison circuit illustrated in FIG. 3 including a first arrangement of the switch circuit.

FIG. 5 is a schematic block diagram of a comparison circuit 164b corresponding to the comparison circuit 164 illustrated in FIG. 3 that includes a first arrangement of a switch circuit 165b. Referring to FIGS. 3 and 5, the comparison circuit 164b may include the switch circuit 165b and the comparator 167. The switch circuit 165b may include the fifth switch 166-1, the sixth switch 166-2, the seventh switch 166-3, and the eighth switch 166-4.

Referring to FIGS. 5 and 7, when the fifth and seventh switches 166-1 and 166-3 are turned on (closed) during the reset phase as shown in FIG. 7, the first comparator 168-1 may compare the reset signal Vrst with the ramp signal Vramp and may output the comparison signal CDSout, i.e., the first comparison signal CDSout1 corresponding to the comparison result. When the seventh switch 166-3 is turned on and the eighth switch 166-4 is turned off during the reset phase, the image signal Vim may be applied to the transistor pair M3 and M4 in the second comparator 168-2. Accordingly, the second comparator 168-2 does not perform the comparison of the image signal Vim and the ramp signal Vramp. When the fifth switch 166-1 and the seventh switch 166-3 are turned on and the sixth switch 166-2 and the eighth switch 166-4 are turned off, the switch circuit 165b is referred to as being in a first arrangement.

Figure 6:
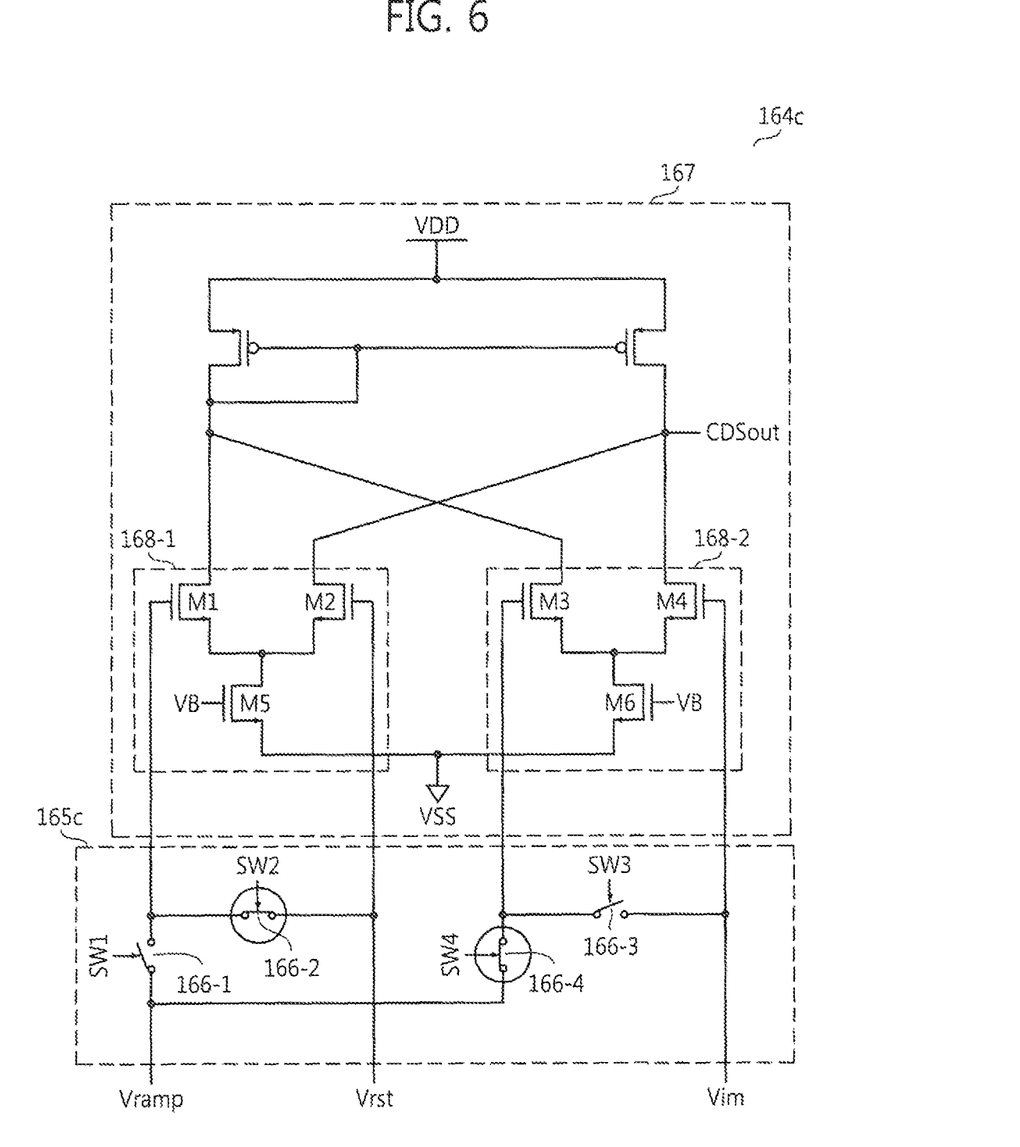
FIG. 6 is a schematic block diagram of the comparison circuit illustrated in FIG. 3 including a second arrangement of the switch circuit.

FIG. 6 is a schematic block diagram of a comparison circuit 164c corresponding to the comparison circuit 164 illustrated in FIG. 3 that includes a second arrangement of a switch circuit 165c. Referring to FIGS. 3 and 6, the comparison circuit 164c may include the switch circuit 165c and the comparator 167. The switch circuit 165c may include the fifth switch 166-1, the sixth switch 166-2, the seventh switch 166-3, and the eighth switch 166-4.

Referring to FIGS. 6 and 7, when the sixth and eighth switches 166-2 and 166-4 are turned on (closed) during the image phase as shown in FIG. 7, the reset signal Vrst may be applied to the transistor pair M1 and M2 in the first comparator 168-1 in the image phase. Accordingly, the first comparator 168-1 does not perform the comparison of the reset signal Vrst and the ramp signal Vramp.

The second comparator 168-2 may compare the image signal Vim with the ramp signal Vramp and may output the comparison signal CDSout, i.e., the second comparison signal CDSout2 corresponding to the comparison result. When the sixth switch 166-2 and the eighth switch 166-4 are turned on and the fifth switch 166-1 and the seventh switch 166-3 are turned off, the switch circuit 165c is referred to as being in a second arrangement. The switch circuits 165a, 165b, and 165c may be implemented as different arrangements according to the switch control signals SW1, SW2, SW3, and SW4 included in the control signals CS.

FIG. 7 is a timing chart showing an operation of the comparison circuit 164 illustrated in FIG. 3. Referring to FIGS. 1 through 7, the third and fourth switches 162 and 163 may be turned on (closed) in response to the third and fourth switch signals S3 and S4, respectively, during the IP; and the comparison circuit 164 may be reset in response to the first and fourth switch control signals SW1 and SW4. In other words, the switch circuit 165a included in the comparison circuit 164a may have the third arrangement as shown in FIG. 4.

When the first switch 132 is turned on in response to the first switch signal S1 that is activated at a time point t3, the first CDS circuit 135 may perform CDS on the pixel signal Vpix, i.e., the reset signal Vrst that is output from the pixel 10. Accordingly, the switch circuit 165a may change into the switch circuit 165b, that is, the first arrangement illustrated in FIG. 5, in response to the first and third switch control signals SW1 and SW3.

When the second switch 133 is turned on in response to the second switch signal S2 that is activated at a time point t5, the second CDS circuit 140 may perform CDS on the pixel signal Vpix, i.e., the image signal Vim that is output from the pixel 10. In other words, the CDS circuit 131 may perform CDS on the reset signal Vrst and the image signal Vim during a period from the time point t3 to a time point t6.

During the reset phase, the switch circuit 165b may remain in the second arrangement as shown in FIG. 5, so that the first comparator 168-1 may compare the reset signal Vrst with the ramp signal Vramp. When, at t8, the level of the reset signal Vrst is the same as that of the ramp signal Vramp, the comparator 167 may output the comparison signal CDSout, i.e., the first comparison signal CDSout1.

The control circuit 171 may determine the level of each of the control signals CS, e.g., the switch control signals SW1 through SW4 based on the state transition of the first comparison signal CDSout1 and may transmit the control signals CS, e.g., the switch control signals SW1 through SW4, generated according to the determination result to the switch circuit 165a or 165b. The control circuit 171 may output the control signals CS within a single period of the clock signal CLK.

The switch control signals SW1 and SW3 may be deactivated and the switch control signals SW2 and SW4 may be activated at a time point t9. As a result, the arrangement of the switch circuit in the comparison circuit 164 may change from the first arrangement illustrated in FIG. 5 to the second arrangement illustrated in FIG. 6.

During the image phase, the second comparator 168-2 in the comparison circuit 164c may compare the image signal Vim with the ramp signal Vramp. When, at t10, the level of the image signal Vim is the same as that of the ramp signal Vramp, the comparator 167 may output the comparison signal CDSout, i.e., the second comparison signal CDSout2.

The control circuit 171 may output the output signal Vout to the counter 181 based on the state transition of the first comparison signal CDSout1 and the state transition of the second comparison signal CDSout2. The counter 181 may convert a transition time of the level of the output signal Vout into the digital signal Dout using the clock signal CLK and may output the digital signal Dout. For instance, counting may start based on the state transition of the first comparison signal CDSout1 and may end based on the state transition of the second comparison signal CDSout2.

Figure 8:
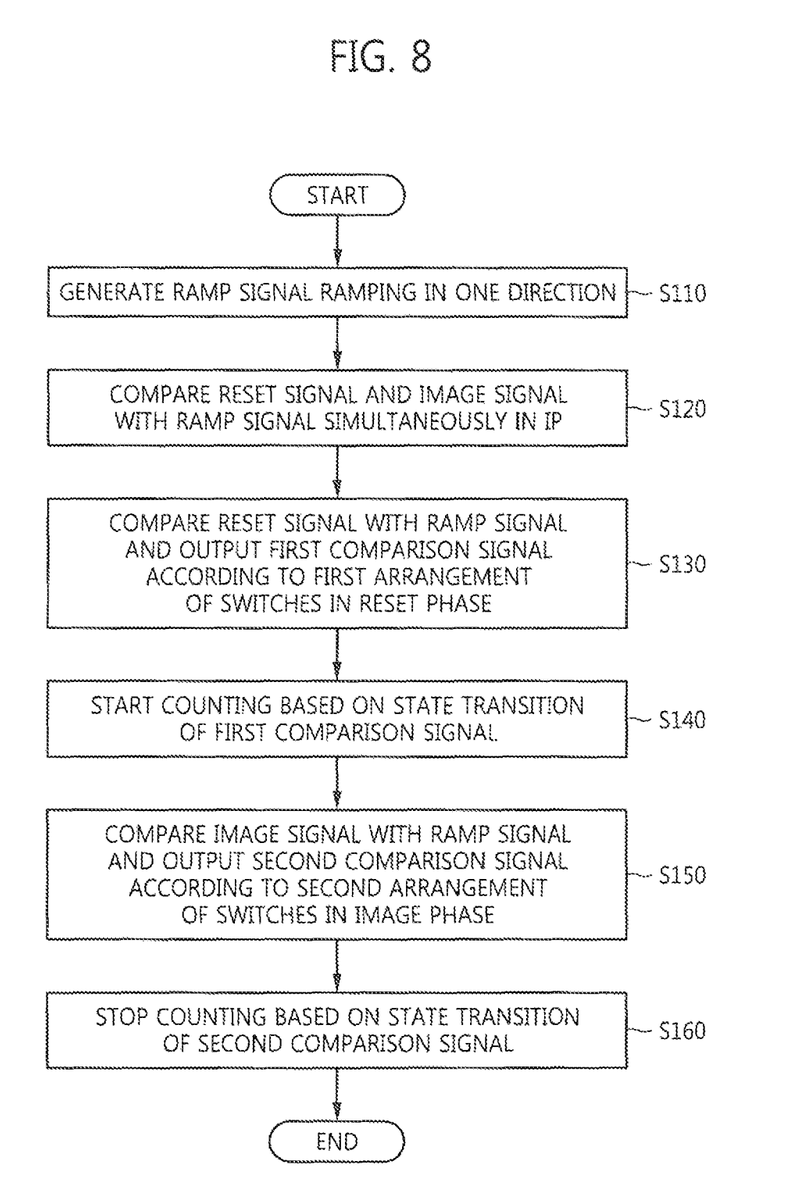
FIG. 8 is a flowchart of a method of operating the CMOS image sensor illustrated in FIG. 1.

FIG. 8 is a flowchart of a method of operating the CMOS image sensor 100 illustrated in FIG. 1. Referring to FIGS. 1 through 8, the ramp generator 210 may generate the ramp signal Vramp, which may ramp in one direction as shown in FIG. 7, in operation S110. Referring to FIGS. 4, 7, and 8, the first comparator 168-1 may compare the reset signal Vrst with the ramp signal Vramp, and simultaneously, the second comparator 168-2 may compare the image signal Vim with the ramp signal Vramp during the IP in operation S120.

Referring to FIGS. 5, 7, and 8, the first comparator 168-1 may compare the reset signal Vrst with the ramp signal Vramp and may output the first comparison signal CDSout1 according to the first arrangement of the switch circuit 165b in the reset phase in operation S130. Referring to FIGS. 6, 7, and 8, the second comparator 168-2 may compare the image signal Vim with the ramp signal Vramp and may output the second comparison signal CDSout2 according to the second arrangement of the switch circuit 165c in the image phase in operation S150.

The counter 181 may start counting based on the state transition of the first comparison signal CDSout1 corresponding to the output signal Vout in operation S140 and may stop counting based on the state transition of the second comparison signal CDSout2 corresponding to the output signal Vout in operation S160.

Referring to FIGS. 7 and 8, the control circuit 171 may output the output signal Vout. The output signal Vout is activated when the first comparison signal CDSout1 is activated from a low level to a high level, and is deactivated when the second comparison signal CDSout2 is activated from a low level to a high level. Accordingly, the counter 181 may start counting when the output signal Vout is activated and may stop counting when the output signal Vout is deactivated.

Figure 9:
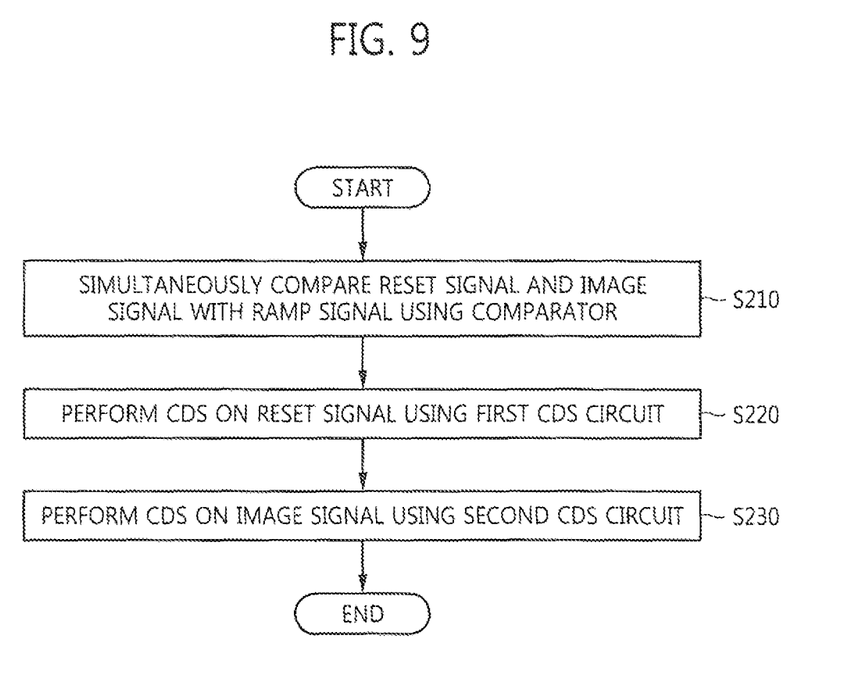
FIG. 9 is a flowchart of a method of operating the CMOS image sensor illustrated in FIG. 1.

FIG. 9 is a flowchart of a method of operating the CMOS image sensor 100 illustrated in FIG. 1. Referring to FIGS. 1 through 9, the first CDS circuit 135 may perform CDS on the pixel signal Vpix, i.e., the reset signal Vrst output from the pixel 10 in operation 8220. The second CDS circuit 140 may perform CDS on the pixel signal Vpix, i.e., the image signal Vim output from the pixel 10 in operation S230. The comparator 167 may simultaneously compare a CDS reset signal and a CDS image signal with the ramp signal Vramp in operation S210.

Figure 10:
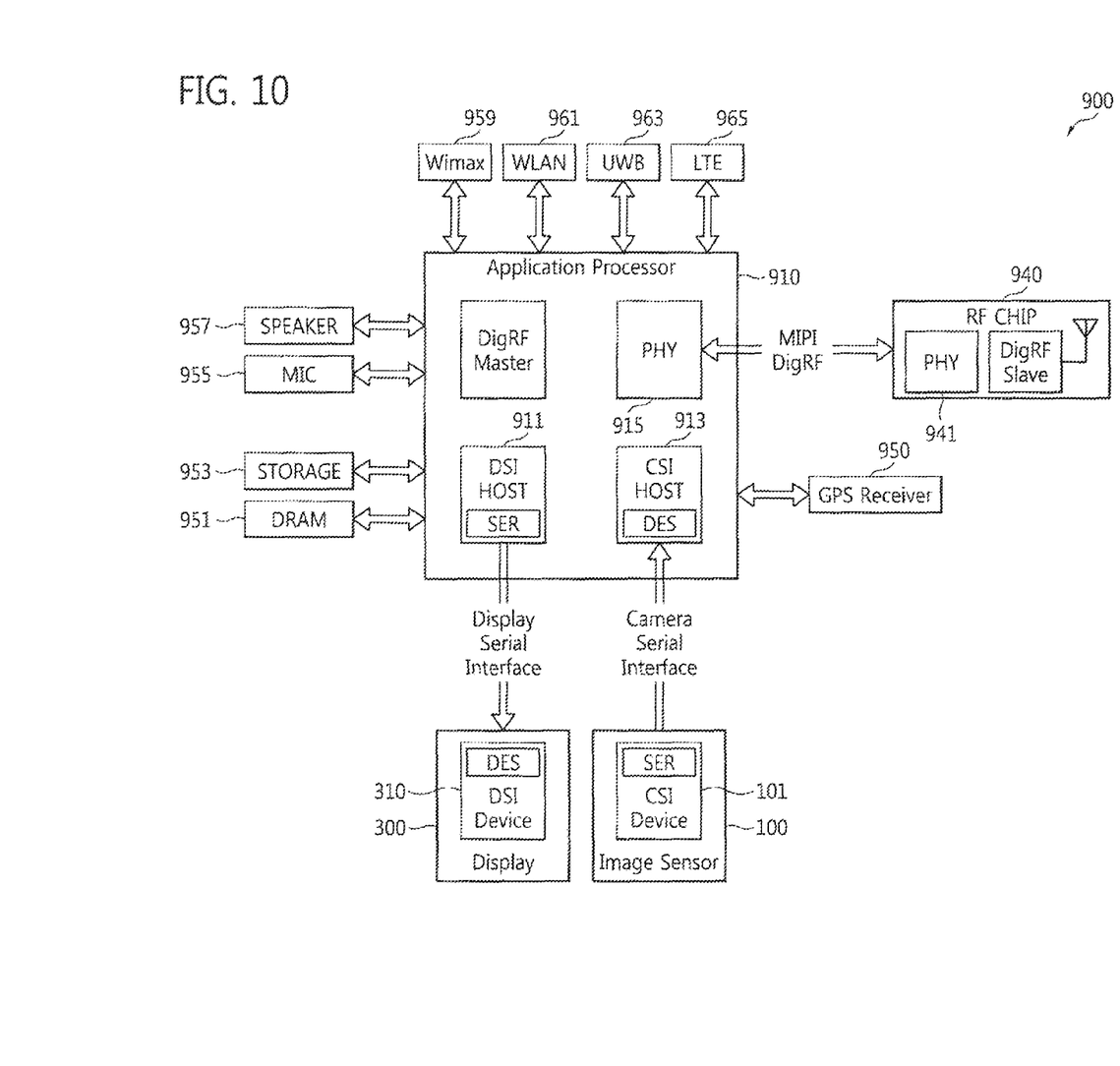
FIG. 10 is a block diagram of an image processing system including the CMOS image sensor illustrated in FIG. 1 according to some embodiments of the inventive concepts.

FIG. 10 is a block diagram of an image processing system 900 including the CMOS image sensor 100 illustrated in FIG. 1 according to some embodiments of the inventive concepts. Referring to FIGS. 1 through 10, the image processing system 900 may be implemented as a portable electronic device which can use or support mobile industry processor interface (MIPI). The portable electronic device may be a laptop computer, a PDA, a portable multimedia player (PMP), a cellular phone, a smart phone, a tablet PC, a digital camera, a MID, or a wearable computer.

The image processing system 900 may include an application processor (AP) 910, the CMOS image sensor 100, and the display 300. A camera serial interface (CSI) host 913 in the AP 910 may perform serial communication with a CSI device 101 in the CMOS image sensor 100 through CSI. A deserializer DES and a serializer SER may be implemented in the CSI host 913 and the CSI device 101, respectively. The CMOS image sensor 100 may be the CMOS image sensors 100 described with reference to FIGS. 1 through 9.

A display serial interface (DSI) host 911 in the AP 910 may perform serial communication with a DSI device 310 in the display 300 through DSI. A serializer SER and a deserializer DES may be implemented in the DSI host 911 and the DSI device 310, respectively. The serializers SER and the deserializers DES may process electrical signals or optical signals.

The image processing system 900 may also include a radio frequency (RF) chip 940 communicating with the AP 910. A physical layer (PHY) 915 of the AP 910 and a PHY 941 of the RF chip 940 may communicate data with each other according to MIPI DigRF.

The image processing system 900 may further include a global positioning system (GPS) receiver 950, a memory 951 such as dynamic random access memory (DRAM), a data storage 953 implemented as a non-volatile memory such as NAND flash memory, a microphone (MIC) 955, and/or a speaker 957. The image processing system 900 may communicate with external devices using at least one communication protocol or standard, e.g., worldwide interoperability for microwave access (Wimax) 959, wireless local area network (WLAN) 961, ultra-wideband (UWB) 963, or long term evolution (LTETM) 965. The image processing system 900 may communicate with external devices using Bluetooth or WiFi.

As described above, according to some embodiments of the inventive concepts, an image sensor may output a digital signal corresponding to a reset signal using a first portion of a ramp signal in a reset phase and may output a digital signal corresponding to an image signal using a second portion of the ramp signal in an image phase. The image sensor may not need analog-to-digital conversion of the reset signal, thereby realizing high-speed operation.

While the inventive concepts has been particularly shown and described with reference to exemplary embodiments thereof, it will be understood by those of ordinary skill in the art that various changes in forms and details may be made therein without departing from the spirit and scope of the inventive concepts as defined by the following claims.

What is claimed is:

1. An image sensor comprising:
    a comparator comprising a first input terminal configured to receive a reset signal, a second input terminal configured to receive an image signal, a third input terminal configured to receive a ramp signal configured to ramp in one direction, and an output terminal; and
    a switch circuit comprising a plurality of switches,
    wherein the comparator is configured to compare the reset signal with the ramp signal and output a first comparison signal through the output terminal according to a first arrangement of the switches in a reset phase and the comparator is configured to compare the image signal with the ramp signal and output a second comparison signal through the output terminal according to a second arrangement of the switches in an image phase, and wherein the comparator is configured to compare the reset signal and the ramp signal and simultaneously compare the image signal and the ramp signal according to a third arrangement of the switches in an initialization phase.

2. The image sensor of claim 1, further comprising a control circuit configured to output control signals configured to change the first arrangement of the switches into the second arrangement of the switches based on a state transition of the first comparison signal.

3. The image sensor of claim 2, wherein the control circuit is configured to output the control signals within a single period of a clock signal from the state transition of the first comparison signal.

4. The image sensor of claim 1, further comprising a counter configured to start counting based on a state transition of the first comparison signal and configured to stop counting based on a state transition of the second comparison signal.

5. The image sensor of claim 1, wherein the comparator is configured to transition from the reset phase to the image phase during a continuous ramp of the ramp signal in one direction.

6. The image sensor of claim 1, farther comprising:
a first correlated double sampling (CDS) circuit configured to transmit the reset signal from a pixel to the first input terminal; and
a second CDS circuit configured to transmit the image signal from the pixel to the second input terminal,
wherein the first CDS circuit and the second CDS circuit are configured to operate at different timings.

7. The image sensor of claim 1, wherein the comparator is a Gilbert cell.

8. The image sensor of claim 1, wherein the comparator is a single-slope analog-to-digital converter.

9. An image processing system comprising:
an image sensor comprising a comparator, the comparator comprising a first input terminal configured to receive a reset signal, a second input terminal configured to receive an image signal, a third input terminal configured to receive a ramp signal configured to ramp in one direction, and an output terminal, and a switch circuit comprising a plurality of switches; and
an application processor configured to control an operation of the image sensor through a camera serial interface,
wherein the comparator is configured to compare the reset signal with the ramp signal and output a first comparison signal through the output terminal according to a first arrangement of the switches in a reset phase and the comparator is configured to compare the image signal with the ramp signal and output a second comparison signal through the output terminal according to a second arrangement of the switches in an image phase, and
wherein the comparator is configured to compare the reset signal and the ramp signal and simultaneously compare the image signal and the ramp signal according to a third arrangement of the switches in an initialize phase.

10. The image processing system of claim 9, further comprising a control circuit configured to output control signals configured to change the first arrangement of the switches into the second arrangement of the switches based on a state transition of the first comparison signal.

11. The image processing system of claim 10, wherein the control circuit is configured to output the control signals within a single period of a clock signal from the state transition of the first comparison signal.

12. The image processing system of claim 9, further comprising a counter configured to start counting based on a state transition of the first comparison signal and configured to stop counting based on a state transition of the second comparison signal.

13. The image processing system of claim 9, wherein the comparator is configured to transition from the reset phase to the image phase during a continuous ramp of the ramp signal in one direction.

14. An image sensor comprising:
a first comparator comprising a first input terminal configured to receive a reset signal based on a reset level of a pixel of the image sensor, and a second input terminal configured to receive at least one of a ramp signal and the reset signal based on a configuration of a first switch and a second switch;
a second comparator comprising a third input terminal configured to receive an image signal based on an image level of the pixel of the image sensor, arid a fourth input terminal configured to receive at least one of the ramp signal and the image signal based on a configuration of a third switch and a fourth switch;
a comparator output terminal connected to the first comparator and the second comparator and configured to output a comparison signal based on a comparison between the ramp signal and at least one of the reset signal and the image signal; and
a control circuit configured to configure the first through fourth switches to produce a first output signal at the comparator output terminal based on a comparison between the ramp signal and the reset signal and, based on an output of the first signal, configure the first through fourth switches to produce a second output signal at the comparator output terminal based on a comparison between the ramp signal and the image signal.

15. The image sensor of claim 14,
wherein the first and second comparators comprise a Gilbert cell, and
wherein the control circuit is configured to configure the first through fourth switches to produce the first output signal and the second output signal during a continuous ramp of the ramp signal in one direction.

16. The image sensor of claim 14, further comprising a counter configured to begin counting a digital count value based on the first output signal, stop counting the digital count value based on the second output signal, and output a digital count value.

17. The image sensor of claim 14, further comprising:
a filth switch configured to electrically connect the comparator output terminal to the first input terminal during an initialization phase; and
a sixth switch configured to electrically connect the comparator output terminal to the third input terminal during an initialization phase,
wherein the control circuit is further configured to configure the first through fourth switches to produce a third output signal at the comparator output terminal during the initialization phase based on a comparison between the ramp signal and the reset signal and based on a comparison between the ramp signal and the image signal.

18. The image sensor of claim 14, further comprising:
a first CDS circuit comprising a fifth switch configured to connect a pixel output to a first CDS node based on a first switch signal, a first capacitor electrically connected between the first CDS node and a ground, and a second capacitor connected between the first CDS node and the first input terminal; and
a second CDS circuit comprising a sixth switch configured to connect the pixel output to a second CDS node based on a second switch signal, a third capacitor electrically connected between the second CDS node and the ground, and a fourth capacitor connected between the second CDS node and the third input terminal.

* * * * *